United States Patent
Sloan

[15] 3,644,129
[45] Feb. 22, 1972

[54] METHOD OF PROCESSING POTATOES PRIOR TO COMBINED FREEZE DRYING AND AIR DRYING

[72] Inventor: Jerry L. Sloan, Portland, Oreg.

[73] Assignee: Lamb-Weston, Inc., Portland, Oreg.

[22] Filed: Oct. 15, 1969

[21] Appl. No.: 866,712

[52] U.S. Cl. ............................................. 99/207, 99/193
[51] Int. Cl. ..................... A23b 7/03, A23l 1/12, A23b 7/04
[58] Field of Search ................................... 99/100, 193, 207

[56] References Cited

UNITED STATES PATENTS

| | | | |
|---|---|---|---|
| 3,012,897 | 12/1961 | Sullivan | 99/207 |
| 3,016,303 | 1/1962 | Cooley | 99/207 |
| 3,175,914 | 3/1965 | Vahlsing | 99/100 |
| 3,355,299 | 11/1967 | McLaughlin | 99/100 |
| 3,394,010 | 7/1968 | Miller | 99/100 |
| 3,397,993 | 8/1968 | Strong | 99/193 |
| 3,438,792 | 4/1969 | Kruger | 99/207 |
| 3,063,849 | 11/1962 | Nelson | 99/207 |
| 3,220,857 | 11/1965 | Hollis | 99/207 |
| 3,261,695 | 7/1966 | Sienkiewicz | 99/207 |
| 3,333,966 | 8/1967 | Willard | 99/100 |
| 3,574,643 | 4/1971 | Lewis | 99/100 |

FOREIGN PATENTS OR APPLICATIONS 1,034,035 6/1966 Great Britain ........................... 99/100

OTHER PUBLICATIONS

Potato Processing, Talburt & Smith, Avi Pub. Co., 1967 pp. 247– 249.

Potatoes, Production, Storage, Processing, Smith, Avi Pub. Co., 1968; p. 595.

*Primary Examiner*—Norman Yudkoff
*Assistant Examiner*—Martin G. Mullen
*Attorney*—Buckhorn, Blore, Klarquist and Sparkman

[57] ABSTRACT

A process of treating potatoes prior to dehydration in which potatoes are cut into pieces of desired physical shape, blanched, cooled in either air or water, and then blanched again. The potato pieces are individually quick frozen and then dehydrated by combined freeze drying and air drying.

3 Claims, No Drawings

METHOD OF PROCESSING POTATOES PRIOR TO COMBINED FREEZE DRYING AND AIR DRYING

This invention relates to a process for treating potatoes prior to their dehydration, and more particularly, to the blanching of such potatoes prior to dehydrating them by combined freeze drying and air drying.

Kruger U.S. Pat. No. 3,438,792 discloses a combined freeze drying and air drying process of dehydrating food products, including potatoes, wherein the product is first frozen, then freeze dried, and finally air dried. The process of the present invention is particularly suited for use preparatory to the Kruger process and results in a potato product that will demonstrate both quicker and better rehydration. Potato pieces processed according to the present invention demonstrate improved physical integrity and texture, rehydrate readily and produce a reconstituted potato piece similar to a freshly boiled potato.

Experience with the Kruger process has shown that the key to improved and quick rehydration of potato pieces dried by such process lies in minimizing the temperature at which such pieces are initially blanched. Blanching is necessary to inactivate the enzymes sufficiently to inhibit subsequent discoloration. Although minimizing the blanching temperature improves the rehydration characteristics, the centers of the pieces will exhibit discoloration if such blanching is done at a temperature appreciably below 160° F., as for example, at approximately 150° F.

It is thus the principal object of the present invention to achieve a product that can be dehydrated by the combined freeze drying and air drying process of the Kruger patent and that will subsequently demonstrate superior rehydration characteristics.

It is a further object of the present invention to produce such a product that will experience minimal sloughing and yet avoid the problem of inferiorly reconstituted or hard centers.

A still further object of the present invention is to provide an improved blanching process for use with a combined freeze drying—air drying dehydration process that will produce a potato piece of superior physical integrity and texture and that will rehydrate readily to produce a potato piece similar to a freshly boiled potato.

The process of the present invention treats potato pieces by first blanching them, then cooling them, and then blanching them again. The potato pieces are individually quick frozen and then dehydrated according to the process of the Kruger patent. Potatoes treated according to the present invention exhibit superior rehydration characteristics.

Specifically, the process of the present invention comprises peeling the potatoes, cutting them into the desired physical shape, rinsing off the free starch, and then soaking them in a dilute solution of sodium bisulfite. The potato pieces are then blanched for from 5 to 30 minutes in water having a temperature of between 160° and 180° F. The pieces are then removed from the water and cooled for about 5 to 30 minutes in either air or water having a temperature of between 33° and 80° F. and thereafter, blanched a second time for about 5 minutes in water having a temperature of about 160° F.

The thus preliminarily processed potato pieces are individually quick frozen at a temperature between −20° and 0° F. and dehydrated according to the process of the Kruger patent. Specifically, the pieces are freeze dried at subatmospheric pressure from 10 and 60 minutes to experience a weight loss of between 10 and 50 percent of the weight of the frozen product. The product is then subjected to drying in air at atmospheric pressure at a temperature that may range between 140° and 170° F. so as to reduce the moisture content to 7 percent or less of the dry weight of the product.

The process may also include using glucose or starch hydrolysates, such as the hydrolized cereal solids sold by Grain Processing Corporation under the brand name "Maltrin," in the blanch water to provide a serial water blanch to build up solids in the blanch water and thus retard the leaching of soluble solids from the potato pieces. It will be understood of course by those skilled in the art that different sizes of potato pieces processed according to the present invention will require different blanching times.

EXAMPLE 1

Washington russet Burbank potatoes were peeled, cut into ⅜-inch cubes and rinsed free of surface starch. Sulfite was applied to the potatoes by soaking them for 5 minutes in an 0.03 percent sodium bisulfite solution. The potatoes were then placed in 180° F. water containing 0.5 percent sodium acid pyrophosphate, and the water was allowed to cool to 160° F., at which temperature the blanch water was maintained. The potato pieces were held in the 160° F. blanch for a period of time sufficient to achieve a total time of 15 minutes in the water.

The potato pieces were then removed to a 40° F. room on stainless steel wire mesh screens. Air at a temperature of between 40° and 45° F. was then circulated over the potatoes for 10 minutes. After thus being cooled, the potatoes were reblanched in 160° F. water for 5 minutes. The potatoes were then individually quick frozen by placing them in air at −10° F.

After preliminary preparation as above disclosed, the potato cubes were freeze dried for 1 hour to achieve a 32.4 percent weight loss and then air dried by placing them in air at a temperature of between 145° and 150° F. for 2 hours and 10 minutes. When reconstituted, none of the potato pieces showed any sloughing, and only an insignificant number had hard centers. The pieces were similar to freshly boiled potatoes.

EXAMPLE 2

Washington russet Burbank potatoes were peeled, cut into ⅛-inch slices and rinsed free of potato starch. The slices were soaked for 5 minutes in an 0.03 percent sodium bisulfite solution and then blanched in an 0.5 percent aqueous sodium acid pyrophosphate solution for 10 minutes at 172° F. The pieces were next cooled on stainless steel wire mesh screens in 40° to 45° F. air for 10 minutes and thereafter reblanched by placing them in 160° F. water for 5 minutes.

Following the second blanch, the potato slices were individually quick frozen by placing them in air at −10° F. The slices were then freeze dried for 10 minutes to achieve a weight loss of 13.3 percent of the weight of the frozen product. Air drying was for 2 hours 30 minutes in air at a temperature of between 145° and 150° F.

Upon reconstitution, the pieces exhibited a minimum amount of sloughing and none had hard centers. The reconstituted product was similar to freshly boiled potatoes.

EXAMPLE 3

Washington russet Burbank potatoes were prepared as in Example 1, except that between the two blanching steps they were cooled for 10 minutes by placing them in ambient air (60°–80° F.). The finally reconstituted product was equivalent to that achieved in Example 1.

EXAMPLE 4

Washington russet Burbank potatoes were prepared again as in Example 1, except that they were cooled by immersing them in 60°–65° F. water between the two blanching steps. Although some leaching was experienced, a satisfactorily reconstituted product was achieved.

I claim:

1. In a process for dehydrating potato pieces for subsequent reconstitution in water, the steps comprising
   peeling said potatoes,
   cutting said potatoes into pieces,
   blanching said pieces for about 5 to 30 minutes in water having a temperature of between about 160° and 180° F.,
   cooling said pieces for about 5 to 30 minutes in a fluid medium having a temperature of between about 33° and 80° F., blanching said pieces again in water having a temperature of about 160° F., freezing said pieces, freeze-drying said pieces for a period of time sufficient to remove water by sublimation from the external regions thereof to provide a porous surface layer through which the moisture in the interior can readily pass, and then air-drying said pieces to a desired moisture content, whereby said pieces may be subsequently reconstituted in water.

2. The process of claim 1 in which said cooling of said pieces is done in air at a temperature of between about 40° and 80° F. for about 10 minutes.

3. The process of claim 1 in which said cooling of said pieces is done in water.

* * * * *